UNITED STATES PATENT OFFICE.

JOSEPH C. WHITING, OF ST. LOUIS, MISSOURI.

IMPROVEMENT IN PROCESSES OF ENAMELING WROUGHT-IRON.

Specification forming part of Letters Patent No. 179,387, dated June 27, 1876; application filed June 7, 1876.

*To all whom it may concern:*

Be it known that I, JOSEPH C. WHITING, of St. Louis, in the county of St. Louis and State of Missouri, have invented a Process of Enameling Wrought - Iron, so as to imitate gray and dark veined stones, by the application of a solution of ferridcyanide of potassium, or other similar coloring-agent, to the cleaned surface of the iron, and then putting the enamel immediately upon the washed surface, so that the iron, or other coloring-agent in the wash, acts chemically upon, and penetrates from the under side, the coating of enamel-glaze, which it colors or stains in such a manner as to produce the imitations as set forth.

My improved process of enameling wrought-iron consists, first, in the employment of a wash of ferridcyanide of potassium previous to applying the enamel; and, secondly, in the employment of carbonate of ammonia mixed with the enamel previous to its application.

The various steps of my process will be more fully understood by the following description, in which I shall first state my mode of treating the enamel preparatory to its application; and, second, my mode of preparing the iron for and putting on the enamel.

I prepare my enamel by following the usual process to the stage when the enamel is strained of all impurities, and is about the consistency of rich, creamy milk. To the enamel in this stage, and when it is in the dipping-pan, I add carbonate of ammonia until the enamel is of a pasty consistency, the amount added being regulated by the necessity in each case, one mix or run as it comes from the strainer differing a little from another in the amount of water contained in it, the office of the carbonate of ammonia being to precipitate the coloring matter in the wash upon which the enamel is applied. I then take any wrought-iron article and clean the same in the manner usually employed for removing scales from iron. I then wash or sponge the cleaned surface of the iron with an aqueous solution of the ferridcyanide of potassium, when the article is ready to receive the coat of enamel or glaze. I then dip the article into the enamel or glaze, prepared as above described, and then set it aside to allow time for the chemical action of the wash and the glaze or enamel.

This requires usually from twelve to twenty-four hours, the time depending somewhat upon atmospheric influences, and when the chemical action is completed brown veins are seen interlacing the biscuit or enamel coat; and these may be varied, and often rendered more attractive, by the proper management of the drip and skillful manipulation of the article after dipping into the enamel.

By varying the strength of the wash, the iron in which penetrates into the enamel or glaze, as a staining or coloring matter, the distinctness and brilliancy of the veins or coloring may be varied, and the desired imitations of gray and dark veined stones be rendered more striking. The article thus coated and colored is then burned in a muffle in the usual manner, and the effect of the burning not only is to fix the enamel, but to deepen and intensify the colors.

I do not claim to be the first to produce a mottled enamel upon sheet-iron articles; nor do I claim the oxidation of the metallic base during the process of enameling.

Having thus described my invention, I claim—

1. The process of enameling wrought-iron, so as to imitate gray and dark veined stones, by washing the surface in a solution of ferridcyanide of potassium, and then applying the enamel, substantially as set forth.

2. In the process of ornamenting wrought-iron, as above described, the combination of carbonate of ammonia with the enamel employed, substantially as and for the purposes set forth.

In testimony that I claim the foregoing as my own I affix my signature in presence of two witnesses.

JOSEPH C. WHITING.

Witnesses:
   DANIEL BREED,
   THOMAS C. CONNOLLY.